US009600275B2

(12) United States Patent
Fan et al.

(10) Patent No.: US 9,600,275 B2
(45) Date of Patent: Mar. 21, 2017

(54) SMART SOURCE CODE REVIEW SYSTEM

(71) Applicant: International Business Machines Corporation, Armonk, NY (US)

(72) Inventors: Si Bin Fan, Beijing (CN); Jun Hua Gao, Beijing (CN); Wen Li, Beijing (CN); Cheng Fang Wang, Beijing (CN); Xiao Lin Zhang, Beijing (CN); Xue Yong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 14/645,838

(22) Filed: Mar. 12, 2015

(65) Prior Publication Data
US 2016/0266896 A1    Sep. 15, 2016

(51) Int. Cl.
*G06F 9/44*     (2006.01)
*G06F 11/36*    (2006.01)

(52) U.S. Cl.
CPC .......... *G06F 8/73* (2013.01); *G06F 8/33* (2013.01); *G06F 8/71* (2013.01); *G06F 11/36* (2013.01)

(58) Field of Classification Search
CPC .......... G06F 8/73; G06F 8/71; G06F 8/75
USPC .......................................... 717/123
See application file for complete search history.

(56) References Cited

U.S. PATENT DOCUMENTS

| 8,341,600 | B2 | 12/2012 | Sutherland et al. |
| 8,621,421 | B2 | 12/2013 | Klaka et al. |
| 8,843,886 | B2 | 9/2014 | Fox et al. |
| 2014/0196010 | A1 | 7/2014 | Balachandran |

FOREIGN PATENT DOCUMENTS

| IN | 4608/CHEN/2013 A | 9/2014 |
| WO | 2013184364 A2 | 12/2013 |

OTHER PUBLICATIONS

Disclosed Anonymously, "A Method and Tool for Code Review Enhancement," An IP.com Prior Art Database Technical Disclosure, IP.com No. 000224221, Dec. 14, 2012, pp. 1-8.
Mell et al., "The NIST of Cloud Computing," National Institute of Standards and Technology, Information Technology Laboratory, Version 15, Jul. 10, 2009.

*Primary Examiner* — John Chavis
(74) *Attorney, Agent, or Firm* — Michael O'Keefe

(57) ABSTRACT

Reviewing software source code by receiving a changeset containing identified source code text changes. A computer creates a workflow of a source code module using execution paths among logical groupings of source code statements. The computer identifies logical groupings of source code statements in the workflow that contain text changes. The computer generates an integrated graphical user interface that will display a visual indication of the text changes and the logical groupings that contain the text changes, visually indicate logical groupings that contain text changes when selected by a user, visually indicate source code statements associated with a selected logical grouping in the workflow, link user comments for a source code statement and logical groupings to the associated logical groupings and source code statements, respectively, and visually indicate the linked logical groupings and linked source code statements when a source code statement is selected.

20 Claims, 10 Drawing Sheets

SMART SOURCE CODE REVIEW SYSTEM

FIELD OF INVENTION

The present invention relates generally to the field of computing, and more particularly to peer review of source code.

BACKGROUND

Source code peer review is a type of source code analysis in which a developer and one or more reviewers evaluate the content and quality of the proposed source code. Peer review of source code is, typically, separated into formal code review and informal code review. Formal code review, such as Fagan inspection, is a detailed process with multiple phases and participants. Informal code review practices, such as email pass-around, may require less overhead and may typically be part of the standard software development process. In an informal code review process, the source code developer may submit the proposed source code into a source code management system (SCM). The SCM will alert a reviewer of the developer submission. The reviewer analyzes the proposed source code and makes suggested revisions, such as global comments for the entire body of source code or specific line comments within the source code. Subsequently, the developer may institute the suggested revisions to the proposed source code.

SUMMARY

Embodiments of the present invention disclose a method for reviewing software source code. The method comprising receiving, by a computer, a changeset object containing information that identifies text changes made to source code statements in a source code module. The computer creates a workflow of the source code module after the text changes identified in the changeset, wherein the workflow identifies execution paths among logical groupings of source code statements in the source code module. The computer also identifies logical groupings of source code statements in the workflow that contain text changes identified in the changeset. The computer also generates an integrated graphical user interface (GUI) that will display source code statements in the source code module with a visual indication of the identified text changes, display the workflow with a visual indication of the logical groupings of source code statements in the source code module that contain the text changes identified in the changeset, visually indicate logical groupings in the workflow that contain text changes that are selected by a user in the displayed source code statements, visually indicate source code statements in the displayed source code statements that are contained in a selected logical grouping in the workflow, link user comments that are associated with a source code statement in the displayed source code statements to the logical groupings in the workflow that contain the associated source code statements, link user comments that are associated with a logical grouping in the workflow to the source code statements in the displayed source code statements that contain the associated logical grouping, visually indicate the linked logical groupings when a source code statement in the displayed source code statements is selected, and visually indicate the linked source code statements when a logical grouping in the workflow is selected.

DETAILED DESCRIPTION

Figure 1:
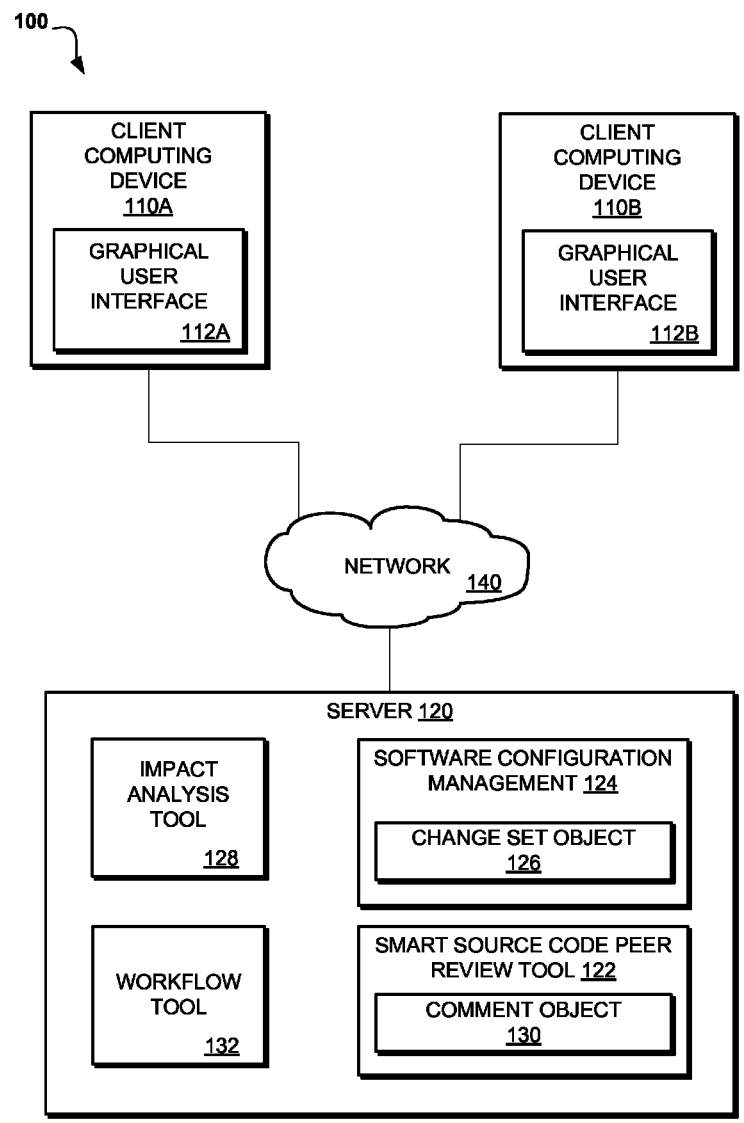
FIG. 1 is an illustration of an exemplary architecture for a smart source code peer review system, in accordance with one embodiment of the present invention.

Embodiments of the present invention are directed to implementing a smart source code review system for peer reviews of source code. A source code difference, or "diff," is a comparison of files of source code. The diff may be used by source code reviewers when analyzing and providing comments for a source code document created by a developer. In embodiments, a diff may be presented in side-by-side windows where one window displays the original source code before the developer-implemented changes and another window displays the edited source code after the developer-implemented changes.

In typical source code peer review systems, when suggesting modifications to the developer-implemented changes, a graphical user interface may display a diff, and a reviewer may provide either a specific line comment or a general global document comment. A line comment, is a reviewer suggestion directed to a specific line of source code. A reviewer may give a line comment for a specific line of source code when the source code on a particular line has a problem or defect. The reviewer may spend excessive time generating a line comment because the reviewer may want to locate and link a number of lines of source code to the line comment. A general global document comment, or global comment, is a reviewer suggestion directed to the source code document as a whole rather than specific lines of source code. A reviewer may leave a global comment when a general problem with the source code is presented. For example, if the reviewer wishes to comment on the work flow level of a source code document, a global comment may be more appropriate than an in-line comment.

The developer may have difficulty modifying source code when considering reviewer comments. For example, if a reviewer suggests that a developer add a new branch to a workflow level by generating a global comment, the global comment may not provide the developer with direct information on where to add the source code text needed to create the new workflow branch. Additionally, many code review tools may use a diff that only shows the developer proposed source code alongside a reviewer suggested revision of the proposed source code. Typically, these code review tools may only indicate lines or sections of the changed source code without indicating what the changes are and how those changes may impact other lines or sections of the source code. As such, it may be advantageous, among other things, for a source code review tool to allow developers to better understand the impact of reviewer suggestions on the source code document should the developer accept the reviewer comments.

According to one embodiment, when a reviewer opens a change review request submitted by a developer, an integrated display of the source code diff and the before-and-after workflow is presented via a graphical user interface. In the source code diff portion of the display, the reviewer may be presented with a series of marks, or indicator icons, on the source code diff. Clicking on an indicator icon may open a workflow, or class, diff display. A workflow diff may provide the reviewer with a side-by-side visual representation of the workflow before and after code changes were implemented by the developer. By selecting a step in the workflow, the reviewer may be directed to a corresponding section of the source code. In addition to providing a specific line comment or a global comment, the reviewer may directly comment on the workflow. For example, when suggesting the addition of a new branch to the workflow, the reviewer may add the new suggested branch directly on the workflow diff and include any detailed comments. Upon inserting a comment directly on the workflow diff, the comment may be mapped to the specific lines or sections of source code that apply to that section of the workflow. Therefore, embodiments of the present invention may have the capacity to improve the technical field of source code review by providing reviewers and developers the ability to more thoroughly comprehend the impact of source code changes on an integrated workflow.

FIG. 1 is an illustration of an exemplary architecture for a smart source code peer review system in accordance with one embodiment of the present invention. The smart source code peer review system 100 may include a server 120 and client computing devices 110, all interconnected over a network 140. Generally, the networked computer environment 100 may include a plurality of client computing devices 110 and servers 120, in accordance with embodiments of the invention.

The communication network 140 may include various types of communication networks, such as a wide area network (WAN), local area network (LAN), a telecommunication network, a wireless network, a public switched network and/or a satellite network, and may include connections, such as wire, wireless communication links, or fiber optic cables. In general, communication network 140 can be any combination of connections and protocols that will support communications between client computing devices 110 and server 120, in accordance with embodiments of the invention.

In various embodiments of the invention, a client computing device 110 may be, for example, a laptop computer, tablet computer, netbook computer, personal computer (PC), a desktop computer, a personal digital assistant (PDA), a smart phone, or any type of computing device capable of running a program, accessing a network, and displaying a graphical user interface 112 used for executing a smart source code peer review tool 122.

Server computer 120 may be a laptop computer, netbook computer, personal computer (PC), a desktop computer, or any programmable electronic device capable of hosting smart source code peer review tool 122, software configuration management system 124, impact analysis tool 128, and workflow tool 132, described below, and communicating with client devices 110 via network 140, in accordance with embodiments of the invention. Server computer 120 may include internal and external hardware components, as depicted and described in further detail below with reference to FIG. 5. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

In accordance with one embodiment, the software configuration management system 124 may track and store source code edits or changes made to the source code by a developer using a graphical user interface 112 on a client computing device. The edits to the source code document may be stored within a changeset object 126. A changeset object 126 may contain files and information relating to the original source code and changes the developer has made to the source code. For example, if the developer discovers a defect within the source code document and, subsequently, edits the source code to correct the defect, a changeset object 126 may be created to store the edits made to the source code document.

Upon completing revisions or edits to the source code document, the developer may wish to have the edited source code reviewed for accuracy and completeness. To initiate a review of the source code by a reviewer, the developer may submit a change review request. Since multiple changeset objects 126 may be created when the developer edits the source code document, the developer may select the changeset object 126 from the software configuration management system 124 corresponding to the changes to be reviewed in order to initiate the source code peer review process. The change review request may alert a reviewer that the developer has selected modified source code for the reviewer to examine.

Upon developer submission of the change review request, impact analysis tool 128 may perform a software impact analysis of the developer changes to the source code document. In embodiments of the invention, software change impact analysis is a process for identifying potential results or consequences when text is added, deleted, or otherwise modified within the source code. Using static program analysis, an impact analysis tool, such as IBM® Rational® Asset Analyzer, may identify the mainframe and distributed assets that a proposed source code change to an application may affect. Impact analysis may also assist in making changes more quickly and with less risk. By locating affected source code, the impact analysis tool may allow a user to assess the scope of the proposed change. Impact analysis tool 128 may help identify unintended impacts of the developer changes on the source code. The impact analysis tool 128 may retrieve the selected changeset object 126 to analyze the changes made to the source code file. By analyzing the changeset object 126, the impact analysis tool 128 may identify text changes made to the source code, and determine if the workflow for the source code changed, how the workflow changed, and how the developer changes impact the source code. For example, a developer may redefine a variable X from a value of 3 to a value of 10 in a source code document in order to correct defective source code lines A and B. The impact of redefining variable X may correct defective source code lines A and B, however, as an unintended result, source code line C may become defective. The impact analysis tool 128 may determine that redefining variable X may make source code line C defective when the developer may not have recognized the impact of the change. Once complete, the impact analysis tool 128 may store the impact analysis results within the changeset object 126.

Workflow tool 132 may then use the changeset and the impact analysis results in order to create a workflow diff. The workflow tool 132, such as Code To FlowChart Converter 2.0 (Code To FlowChart Converter and all Code To FlowChart Converter-based trademarks and logos are trademarks or registered trademarks of CoCodex.com and/or its affiliates), may display a workflow of the source code, for example, in the form of a flowchart, as it appeared before the developer instituted changes juxtaposed with a workflow of the source code as it appears after the developer instituted changes. Workflow tool 132 may analyze the impact analysis results and the changeset object 126 to create a visual workflow that presents a project overview of the process developed within the source code. By analyzing sections and lines of source code, the workflow tool 132 may understand that certain lines and sections of the source code correspond to particular operations and branches of the workflow. Once the analysis of the impact analysis results and the changeset object 128 is complete, the workflow tool 132 may create the workflow diff using the created workflows.

Workflow tool 132 may generate a workflow diff using the changeset object 126. For example, if the developer inserted source code that adds a new branch to the workflow, the workflow diff may display before and after workflows in windows and panes of a graphical user interface (GUI). The workflow of the source code before the developer added the new branch may be illustrated in one pane or window and the workflow of the source code after the developer added the new branch may be illustrated in another pane or window. The workflow diff, in conjunction with the integrated source code diff, may aid the reviewer in identifying defects within the source code and providing comments and suggested changes to the source code. For example, if a developer edits a line within the source code document in order to bring about a result A, the impact analysis tool may analyze the changeset object 126 and identify that the change also brought about a result B, which may be an unintended defect in the source code. Once created, information to generate the workflow diff may also be stored in the changeset object 126.

Figure 2:
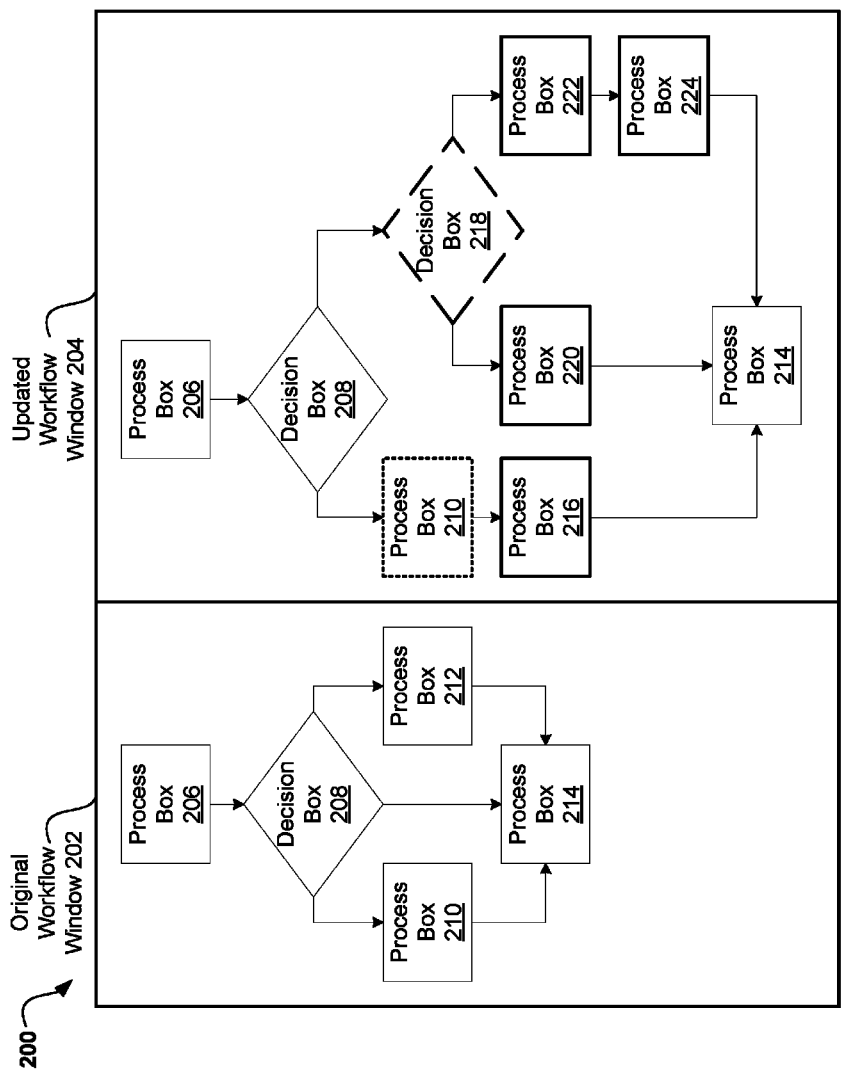
FIG. 2 is an integrated graphical user interface showing a workflow diff window during the source code review process, in accordance with one embodiment of the present invention.

Referring now to FIG. 2, a GUI displaying a workflow diff 200 created by the workflow tool 132 is depicted. Prior to the reviewer commenting on the workflow diff 200, the workflow diff 200 may include an original workflow window 202 depicting the workflow before the developer implemented changes to the source code and an updated workflow window 204 depicting the workflow after the developer implemented changes to the source code. The original workflow window 202 may include elements, such as process boxes 206 and 210-214 and decision boxes, such as decision box 208. If the developer has modified, added, or deleted elements presented in the original workflow window 202 while editing the source code, the updated workflow window 204 may present different workflow elements. For example, the developer may have altered the source code, resulting in the removal of process box 210 and the insertion of decision box 216. Similarly, the developer may modify process box 212 to become decision box 218 and add process boxes 220-224 branching off of decision box 218. Additionally, the elements added or modified by the developer changes to the source code may be highlighted in contrasting colors or represented in different line weights or line patterns in order to make the developer changes conspicuous to the reviewer. For example, deleted process box 210 may have a dotted line pattern, process box 212 modified to decision box 218 may have a dashed line pattern, and added process boxes 216 and 220-224 may have a heavy line weight.

Referring back to FIG. 1, upon completion of the impact analysis and creation of the workflow diff, the smart source code peer review tool 122 may create the source code diff using the changeset object 126. As previously described, the source code diff may be a side-by-side comparison of the source code before and after the developer instituted changes to the source code. If the developer made a change to a line of source code, the changed line of source code may be highlighted to indicate that the line of source code changed. For example, if the developer changed a variable value from 0 to 1 in a line of source code, then the changed line of source code may be highlighted.

Figure 3:
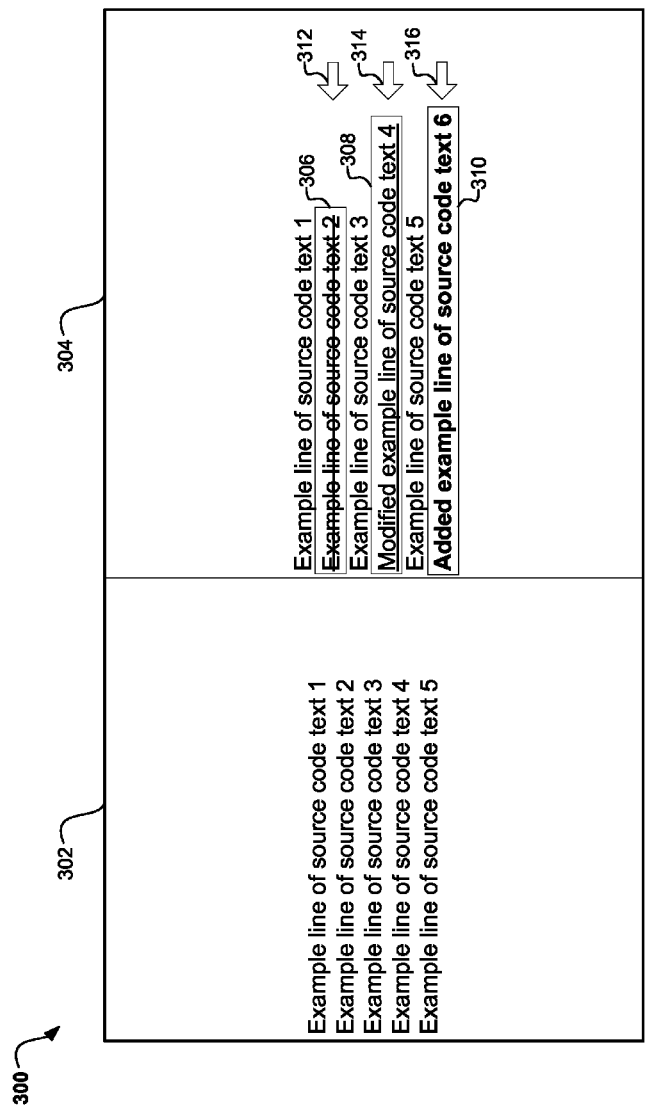
FIG. 3 is an illustration of an integrated graphical user interface showing a source code diff window that includes an indicator icon linking the source code diff with a workflow diff, in accordance with one embodiment of the present invention.

Referring now to FIG. 3, a graphical user interface showing a source code diff window that includes an indicator icon linking the source code diff with the workflow diff is illustrated, in accordance with one embodiment of the present invention. The source code diff 300 may contain two windows for displaying the source code in the source code language text, such as extensible markup language or hypertext markup language. An original source code window 302 may display the lines of source code prior to the developer instituting changes in order to cure a defect within the source code. An updated source code window 304 may display the lines of source code as they appear after the developer institutes changes in order to cure defects within the source code. The modified, added, and deleted source code lines may be highlighted or presented in a different color, font, or format. For example, a deleted line of source code text 306 may be presented in strikethrough text format, a modified line of source code text 308 may be underlined, and an added line of source code text 310 may be presented as bolded text. The updated source code window 304 may include an indicator icon 312-316 alongside changed source code lines that may navigate to a corresponding section of the updated workflow window 204 in the workflow diff when selected by the reviewer.

Referring back to FIG. 1, once the source code diff is created, the smart source code peer review tool 122 may "connect" the source code diff and the workflow diff using the impact analysis results stored in the changeset object 126. Connecting the source code diff and the workflow diff may link lines and sections of source code within the source code diff to the corresponding portions of the workflow diff thereby integrating the source code diff and the workflow diff. For example, if lines A through E in the source code diff correspond to branch 1 in the workflow diff, the smart source code peer review tool 122 may connect lines A through E with branch 1 since those sections correspond to each other. When connecting the source code diff and the workflow diff, the smart source code peer review tool 122 may place an indicator icon alongside lines or sections of source code that, when selected, may present the reviewer with the corresponding section of the workflow diff. For example, when reviewing lines A through E of a source code diff, a reviewer may select the indicator icon and the smart source code peer review tool 122 may present branch 1 of the workflow diff corresponding to lines A through E of the source code diff. The workflow diff may, therefore, allow the reviewer to visually observe the effects of the developer changes to the source code.

Upon linking the source code diff and the workflow diff, the reviewer may open the change review request using the smart source code peer review tool 122. Once a change review request is opened by the reviewer, the smart source code peer review tool 122 may display the source code diff in a graphical user interface 112 and operate generally to host a software review session of the source code document. Smart source code peer review tool 122 may display the integrated source code diff with marks, or indicator icons, beside changed lines of source code indicating to the reviewer that there may be workflow changes resulting from those developer edits. When the reviewer selects an indicator icon, the smart source code peer review tool 122 may display the section of the workflow diff on a graphical user interface 112 corresponding to the source code beside the selected indicator icon.

When presented the source code diff or the workflow diff, the reviewer may add comments or suggestions to the proposed source code changes. The reviewer may insert text comments, such as line comments and global comments, on the source code diff or the workflow diff. When the reviewer generates comments on a diff, a comment object 130 may be created by and stored in the smart source code peer review tool 122. The reviewer may also draw comments directly on the workflow diff. For example, the reviewer may suggest that the developer add a new branch to the workflow by drawing the new branch and adding a comment directly on the workflow diff. Similarly, the reviewer remove a branch of the workflow within the workflow diff to suggest that the developer delete a branch from the workflow. Reviewer suggestions in the workflow diff to add, delete, or modify branches within the workflow many be presented by contrasting the colors of the workflow objects, changing the line weight of the workflow element, or changing the line pattern of the workflow element. For example, when the reviewer suggests the developer delete a branch from the workflow, the smart source code peer review tool 122 may display the deleted branch in grayscale.

Figure 4:
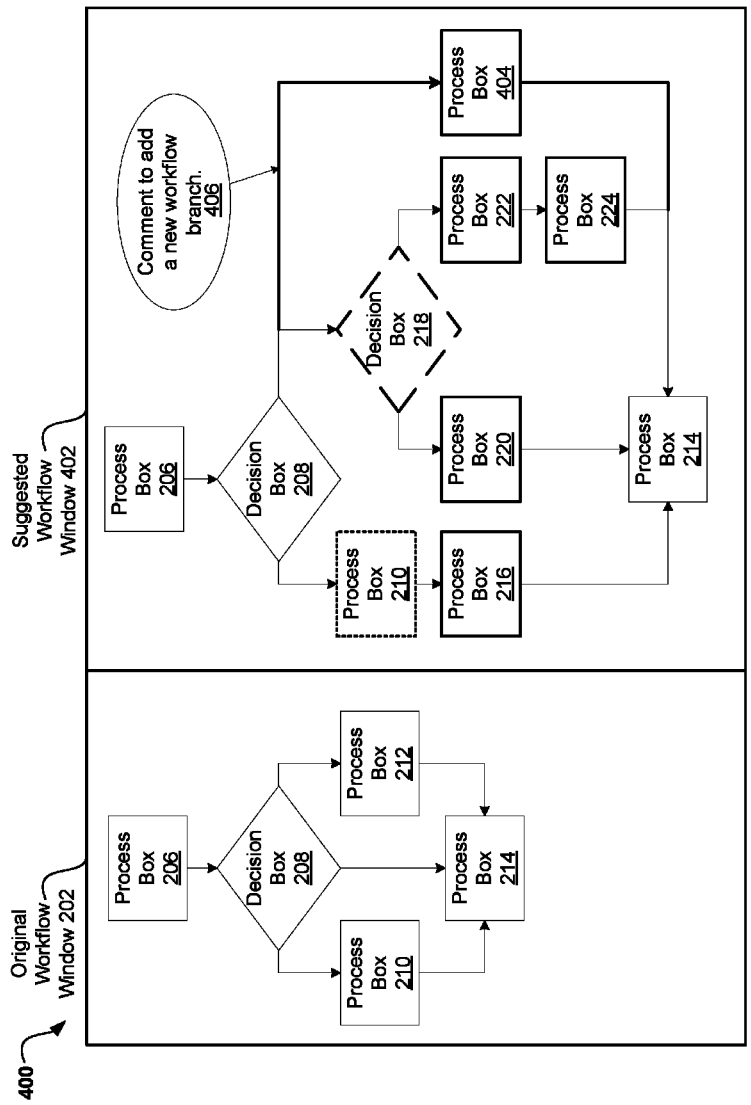
FIG. 4 is an integrated graphical user interface showing a workflow diff window during the source code review process, in accordance with one embodiment of the present invention.

Referring now to FIG. 4, a workflow diff 400 after the reviewer has provided suggestions and comments on the workflow is depicted. After the reviewer comments on the workflow diff 400, the workflow diff 400 may include the original workflow window 202 depicting the workflow before the developer implemented changes to the source code and a suggested workflow window 402 depicting the workflow changes the reviewer suggests the developer incorporate to the source code. The reviewer may edit the updated workflow window 204 (FIG. 2) to create the suggested workflow window 402. The reviewer edits may suggest modifying, deleting, and adding elements to the updated workflow window 204 (FIG. 2). Reviewer suggested edits to the workflow may be indicated in the suggested workflow window 402 by changing the element line pattern, line weight, or color. For example, modified process box 216 may be displayed with a dashed line pattern, added process box 404 may be displayed with a thicker line weight to the element and the added connection arrows, and deleted process box 224 may be displayed with a dotted line pattern for the deleted element and connection arrows. As previously described, the review may also insert comments directly on the workflow. For example, comment box 406 may be added to the suggested workflow window, if the reviewer wishes to suggest the developer add process box 404 and the corresponding workflow arrows.

Referring back to FIG. 1, once the reviewer has completed commenting on and editing the workflow, the smart source code peer review tool may map the reviewer comments within the comment object 130 to the corresponding source code lines or sections within the changeset object 126. For example, the reviewer may suggest that the developer add a new branch to the workflow by drawing the new branch and inserting a text comment on the workflow diff. The smart source code peer review tool 122 may use the impact analysis results to analyze the placement of the reviewer comment on the workflow diff and replicate the reviewer comment in the corresponding lines of source code on the source code diff. Similarly, the smart source code peer review tool 122 may map a comment directly to the workflow diff when the reviewer comments on the source code diff. The smart source code peer review tool 122 may also map comments generated by the reviewer on the source code diff to the corresponding element on the workflow diff.

Figure 5:
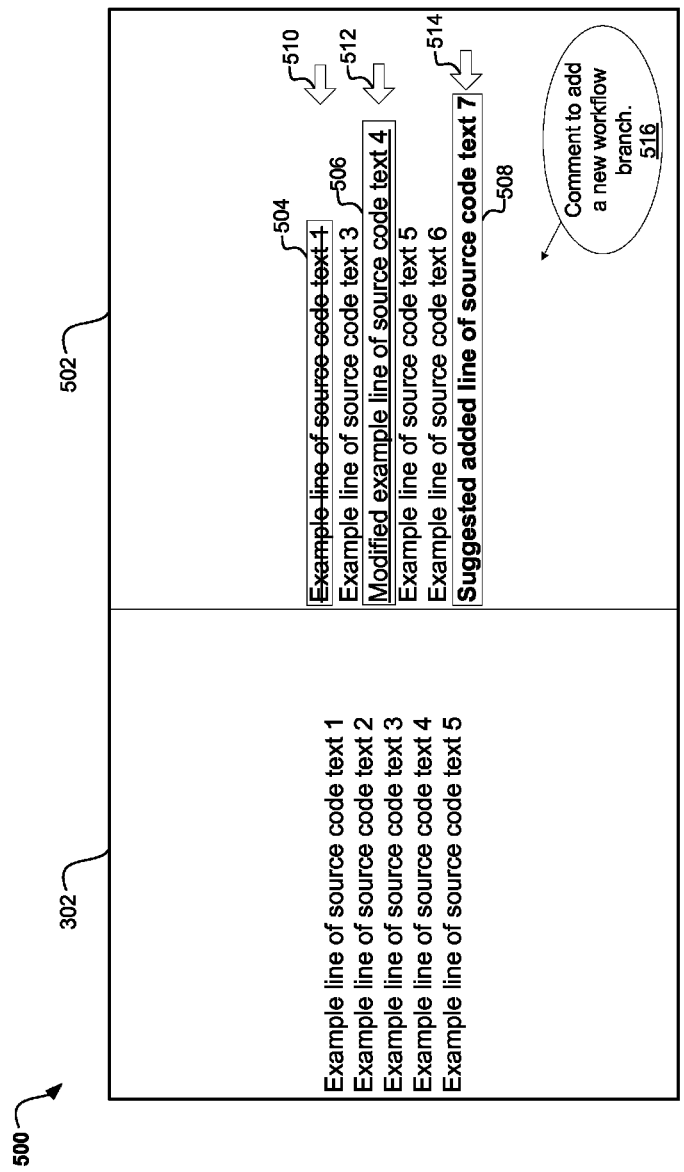
FIG. 5 is an illustration of an integrated graphical user interface showing a source code diff window that includes an indicator icon linking the source code diff with a workflow diff, in accordance with one embodiment of the present invention.

Referring now to FIG. 5, a graphical user interface showing a source code diff window that includes reviewer suggestions and comments is illustrated, in accordance with one embodiment of the present invention. The source code diff 500 may contain two windows for displaying the source code. The original source code window 302 may still display the lines of source code prior to the developer instituting changes in order to cure a defect within the source code. A suggested source code window 502 may display the lines of source code once the reviewer has added, deleted, or modified the source code or workflow. The modified, added, and deleted source code lines may be highlighted or presented in a different color, font, or format. For example, a deleted line of source code text 504 may be presented in strikethrough text format, a modified line of source code text 506 may be underlined, and an added line of source code text 508 may be presented as bolded text. The updated source code window 502 may include indicator icons 510-514 alongside changed source code lines that may navigate to a corresponding section of the suggested workflow window 402 in the workflow diff 400 when selected. The suggested workflow window 502 may also include comment 516. Comment 516 may be inserted by the reviewer directly to the suggested source code window 502 on source code diff 500 or may be inserted to the suggested workflow window 402 and then mapped by the smart source code peer review tool 122 to the suggested source code window 502.

Referring back to FIG. 1, the developer may then open the mapped comment object 130 and the reviewer comments on the source code diff 500 may be displayed. The developer may click on indicator icons 510-514 or comment 516 and the smart source code review tool 122 may present the corresponding sections of the workflow on the graphical user interface 112. Therefore, the developer may be able to visualize the suggestions proposed by the reviewer to the edited source code document.

Figure 6:
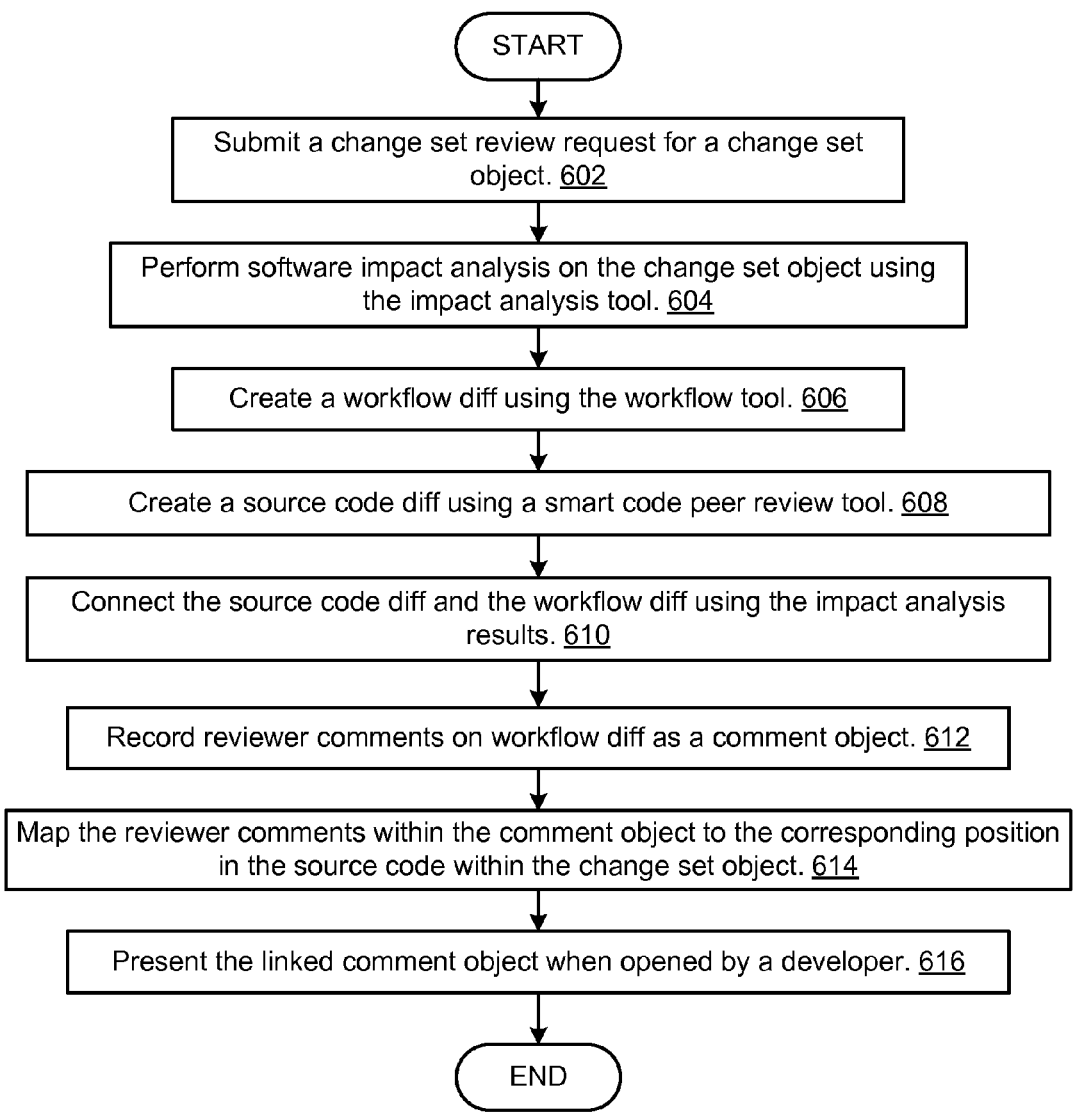
FIG. 6 is operational flowchart illustrating the operational steps carried out by the smart source code peer review tool of FIG. 1, in accordance with one embodiment of the present invention.

FIG. 6 is an operational flowchart 600 illustrating the steps of the smart source code peer review system 122 of FIG. 1, in accordance with an embodiment of the present invention. The developer may begin by submitting a change review request (step 602). Upon submission for review, software impact analysis, or impact analysis, may be performed on the changeset object 126 by an impact analysis tool 128 (step 604). The workflow tool 132 may then analyze the changeset object 126 to create a workflow diff 200 (step 606).

A source code diff 300 may then be created by the smart source code peer review tool 122 using the changeset object 126 (step 608). Once the source code diff 300 is created and displayed using graphical user interface 112, the smart source code peer review tool 122 may connect the source code diff 300 and the workflow diff 200 using the impact analysis results stored in the changeset object 126 (step 610). When the reviewer makes comments on the source code diff or the workflow diff, the smart source code peer review tool 122 may record the comments as a comment object 130 (step 612).

When the reviewer completes a comment on the suggested workflow window 402 of workflow diff 400, the smart source code peer review tool 122 may map the comment to the corresponding position in source code diff 500 (step 614). Once the reviewer has completed commenting on the changeset object 126, the comment object 130 may be presented to the developer (step 616). When the developer opens the comment object 130, source code diff 500 may be presented to the developer. The developer may browse through source code diff 500 and select a comment 516 or indicator icons 510-514 to be navigated to the corresponding section of workflow diff 400.

Figure 7:
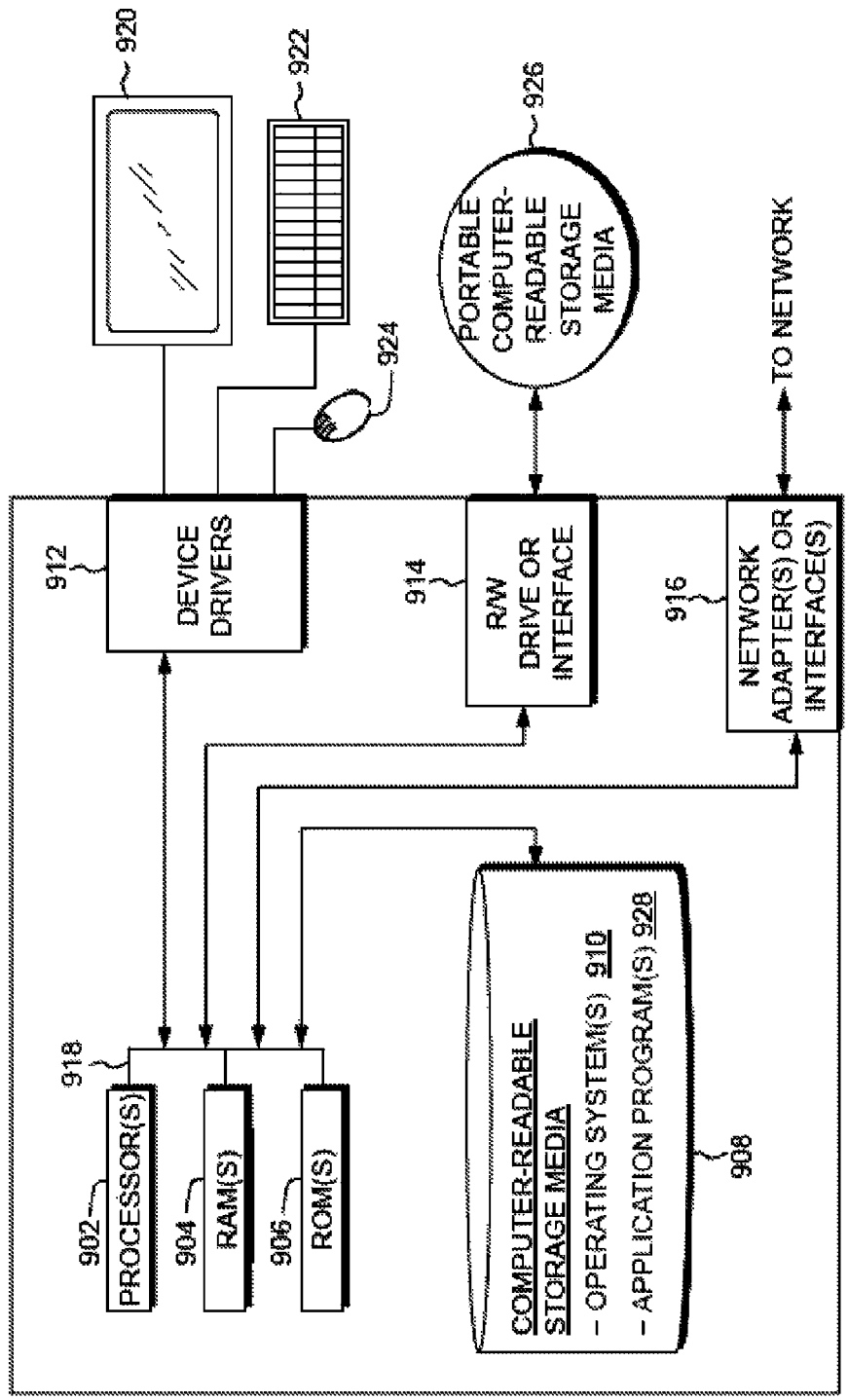
FIG. 7 is a functional block diagram of components of a client computing device and/or a server device of the collaborative document annotation system of FIG. 1, in accordance with an embodiment of the present invention.

FIG. 7 depicts a block diagram of components of a client computing device 110 and/or a server 120 of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Client computing devices 110 and/or a server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, software configuration management system 124, smart source code peer review tool 122, impact analysis tool 128, and workflow tool 132, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computing devices 110 and/or a server 120 may also include a R/W drive or interface 914 to read from and write to one or more portable computer readable storage media 926. Application programs 928 on client computing devices 110 and/or a server 120 may be stored on one or more of the portable computer readable storage media 926, read via the respective R/W drive or interface 914 and loaded into the respective computer readable storage media 908.

Client computing devices 110 and/or a server 120 may also include a network adapter or interface 916, such as a TCP/IP adapter card or wireless communication adapter (such as a 4G wireless communication adapter using OFDMA technology). Application programs 928 on computing devices 110 and/or a server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client computing devices 110 and/or a server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
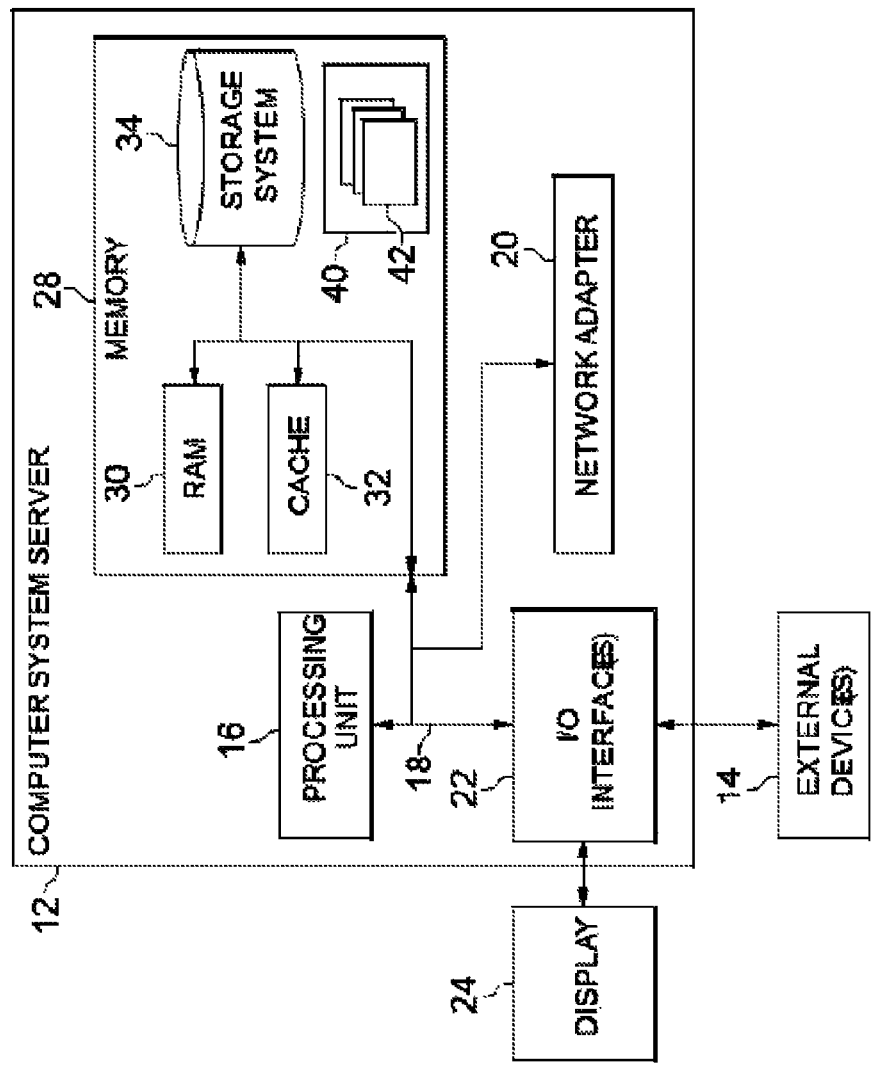
FIG. 8 depicts a cloud computing node according to an embodiment of the present invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
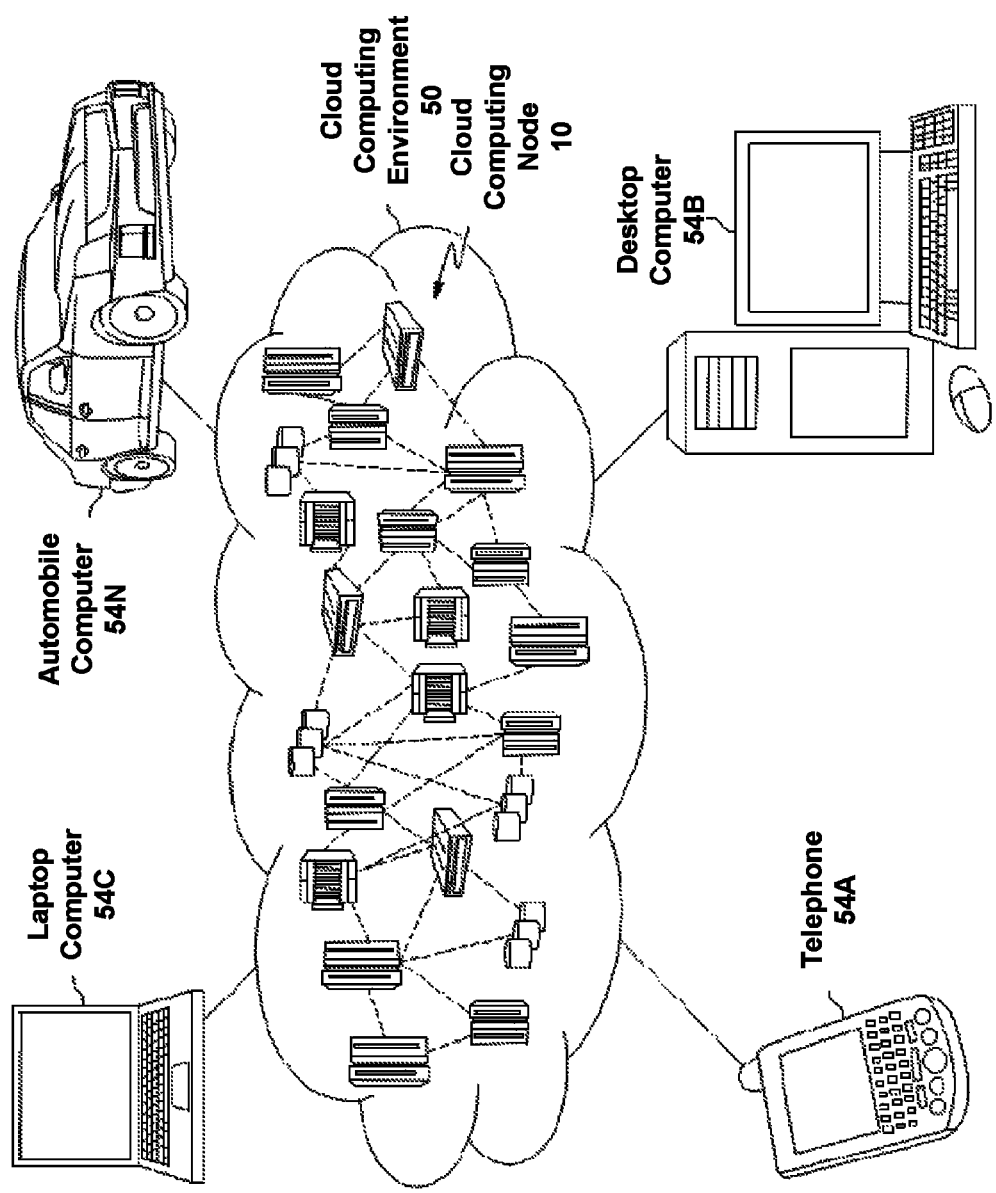
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
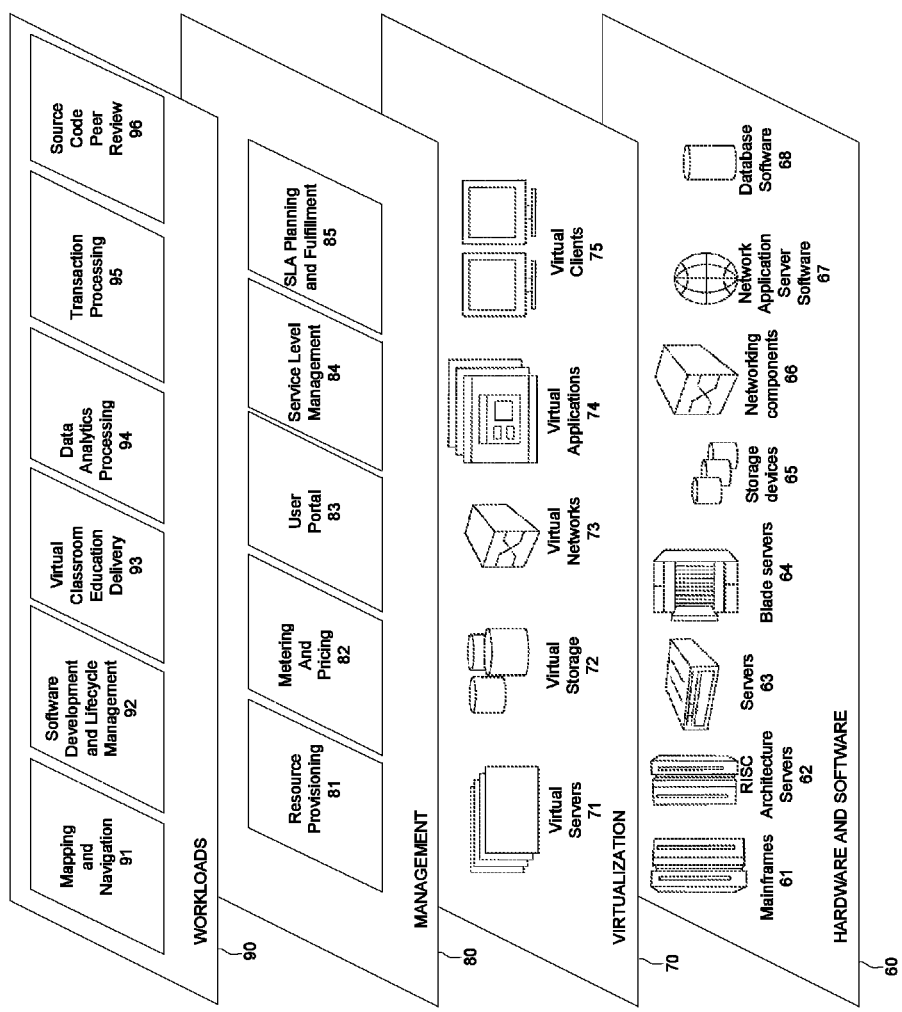
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and peer review of source code 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for reviewing software source code, the method comprising:

receiving, by a computer, a changeset object containing information that identifies text changes made to source code statements in a source code module;

creating, by the computer, a workflow of the source code module after the text changes identified in the changeset, wherein the workflow identifies execution paths among logical groupings of source code statements in the source code module;

identifying, by the computer, logical groupings of source code statements in the workflow that contain text changes identified in the changeset;

generating, by the computer, an integrated graphical user interface (GUI) that will:

display source code statements in the source code module with a visual indication of the identified text changes;

display the workflow with a visual indication of the logical groupings of source code statements in the source code module that contain the text changes identified in the changeset;
visually indicate logical groupings in the workflow that contain text changes that are selected by a user in the displayed source code statements;
visually indicate source code statements in the displayed source code statements that are contained in a selected logical grouping in the workflow;
link comments, entered by the user, that are associated with a source code statement in the displayed source code statements to the logical groupings in the workflow that contain the associated source code statements;
link comments, entered by the user, that are associated with a logical grouping in the workflow to the source code statements in the displayed source code statements that contain the associated logical grouping;
visually indicate the linked logical groupings when a source code statement in the displayed source code statements is selected; and
visually indicate the linked source code statements when a logical grouping in the workflow is selected.

2. The method of claim 1, wherein the linked comments include specific line comments, general global document comments, added workflow branches and elements, deleted workflow branches and elements, and modified workflow branches and elements.

3. The method of claim 1 further comprising:
transmitting, by the computer, the generated integrated graphical user interface to a second user.

4. The method of claim 1, wherein the visual indication of the logical groupings that contain text changes is located adjacent to each logical grouping that contains a text change.

5. The method of claim 1, wherein the visual indication of the identified text changes in the displayed source code statements is located adjacent to each source code statement that contains a text change.

6. The method of claim 1, wherein the visual indication of the logical groupings that contain text changes includes increasing the line weight of workflow elements, decreasing the line weight of workflow elements, changing the line pattern of workflow elements, changing the color of workflow elements, changing the fill color of workflow elements, and changing the fill pattern of workflow elements.

7. The method of claim 1, wherein the logical groupings are flowchart elements, the flowchart elements including process elements, decision elements, document elements, data elements, flowchart start elements, predefined process elements, stored data elements, manual input elements, delay elements, display elements, and connector elements.

8. A computer system for reviewing software source code, the computer system comprising:
one or more processors, one or more computer-readable memories, one or more non-transitory computer-readable tangible storage medium, and program instructions stored on at least one of the one or more non-transitory tangible storage medium for execution by at least one of the one or more processors via at least one of the one or more memories, wherein the computer system is capable of performing a method comprising:
receiving, by a computer, a changeset object containing information that identifies text changes made to source code statements in a source code module;
creating, by the computer, a workflow of the source code module after the text changes identified in the changeset, wherein the workflow identifies execution paths among logical groupings of source code statements in the source code module;
identifying, by the computer, logical groupings of source code statements in the workflow that contain text changes identified in the changeset;
generating, by the computer, an integrated graphical user interface (GUI) that will:
display source code statements in the source code module with a visual indication of the identified text changes;
display the workflow with a visual indication of the logical groupings of source code statements in the source code module that contain the text changes identified in the changeset;
visually indicate logical groupings in the workflow that contain text changes that are selected by a user in the displayed source code statements;
visually indicate source code statements in the displayed source code statements that are contained in a selected logical grouping in the workflow;
link comments, entered by the user, that are associated with a source code statement in the displayed source code statements to the logical groupings in the workflow that contain the associated source code statements;
link comments, entered by the user, that are associated with a logical grouping in the workflow to the source code statements in the displayed source code statements that contain the associated logical grouping;
visually indicate the linked logical groupings when a source code statement in the displayed source code statements is selected; and
visually indicate the linked source code statements when a logical grouping in the workflow is selected.

9. The computer system of claim 8, wherein the linked comments include specific line comments, general global document comments, added workflow branches and elements, deleted workflow branches and elements, and modified workflow branches and elements.

10. The computer system of claim 8 further comprising:
transmitting, by the computer, the generated integrated graphical user interface to a second user.

11. The computer system of claim 8, wherein the visual indication of the logical groupings that contain text changes is located adjacent to each logical grouping that contains a text change.

12. The computer system of claim 8, wherein the visual indication of the identified text changes in the displayed source code statements is located adjacent to each source code statement that contains a text change.

13. The computer system of claim 8, wherein the visual indication of the logical groupings that contain text changes includes increasing the line weight of workflow elements, decreasing the line weight of workflow elements, changing the line pattern of workflow elements, changing the color of workflow elements, changing the fill color of workflow elements, and changing the fill pattern of workflow elements.

14. The computer system of claim 8, wherein the logical groupings are flowchart elements, the flowchart elements including process elements, decision elements, document elements, data elements, flowchart start elements, predefined process elements, stored data elements, manual input elements, delay elements, display elements, and connector elements.

15. A computer program product for reviewing software source code, the computer program product comprising:

one or more non-transitory computer-readable tangible storage medium and program instructions stored on at least one of the one or more non-transitory tangible storage medium, the program instructions executable by a processor, the program instructions comprising:

program instructions to receive, by a computer, a changeset object containing information that identifies text changes made to source code statements in a source code module;

program instructions to create, by the computer, a workflow of the source code module after the text changes identified in the changeset, wherein the workflow identifies execution paths among logical groupings of source code statements in the source code module;

program instructions to identify, by the computer, logical groupings of source code statements in the workflow that contain text changes identified in the changeset;

program instructions to generate, by the computer, an integrated graphical user interface (GUI) that will:

display source code statements in the source code module with a visual indication of the identified text changes;

display the workflow with a visual indication of the logical groupings of source code statements in the source code module that contain the text changes identified in the changeset;

visually indicate logical groupings in the workflow that contain text changes that are selected by a user in the displayed source code statements;

visually indicate source code statements in the displayed source code statements that are contained in a selected logical grouping in the workflow;

link comments, entered by the user, that are associated with a source code statement in the displayed source code statements to the logical groupings in the workflow that contain the associated source code statements;

link comments, entered by the user, that are associated with a logical grouping in the workflow to the source code statements in the displayed source code statements that contain the associated logical grouping;

visually indicate the linked logical groupings when a source code statement in the displayed source code statements is selected; and visually indicate the linked source code statements when a logical grouping in the workflow is selected.

16. The computer program product of claim 15, wherein the linked comments include specific line comments, general global document comments, added workflow branches and elements, deleted workflow branches and elements, and modified workflow branches and elements.

17. The computer program product of claim 15 further comprising:

transmitting, by the computer, the generated integrated graphical user interface to a second user.

18. The computer program product of claim 15, wherein the visual indication of the logical groupings that contain text changes is located adjacent to each logical grouping that contains a text change.

19. The computer program product of claim 15, wherein the visual indication of the identified text changes in the displayed source code statements is located adjacent to each source code statement that contains a text change.

20. The computer program product of claim 15, wherein the visual indication of the logical groupings that contain text changes includes increasing the line weight of workflow elements, decreasing the line weight of workflow elements, changing the line pattern of workflow elements, changing the color of workflow elements, changing the fill color of workflow elements, and changing the fill pattern of workflow elements.

* * * * *